Figure 1:
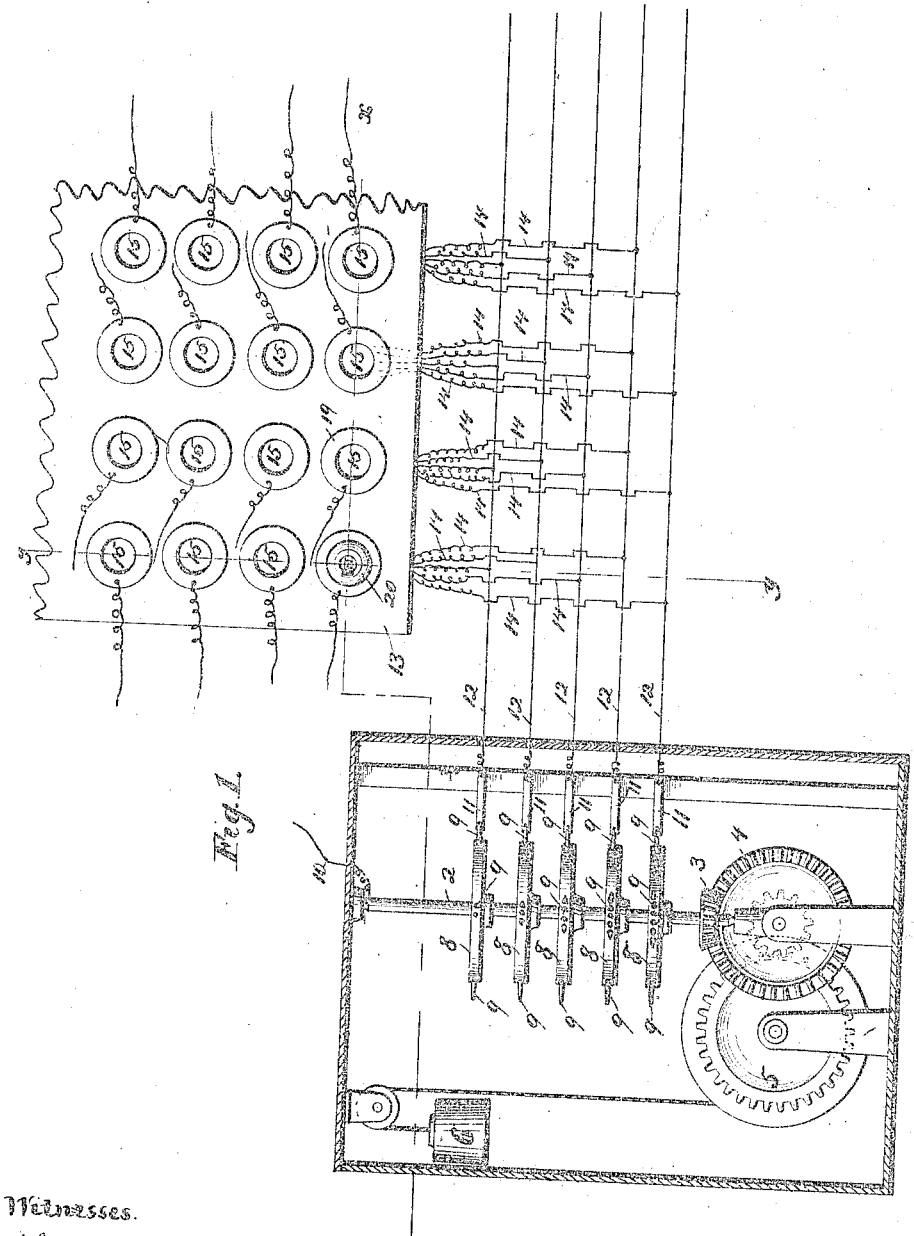

(No Model.)  2 Sheets—Sheet 1.

H. L. CARPENTER.
AUTOMATIC TELEPHONE CALL.

No. 422,722.  Patented Mar. 4, 1890.

Witnesses.
J. Jensen
C. Booth

Inventor.
Henry L. Carpenter.
By Paul & Merwin attys.

(No Model.) 2 Sheets—Sheet 2.
H. L. CARPENTER.
AUTOMATIC TELEPHONE CALL.
No. 422,722. Patented Mar. 4, 1890.
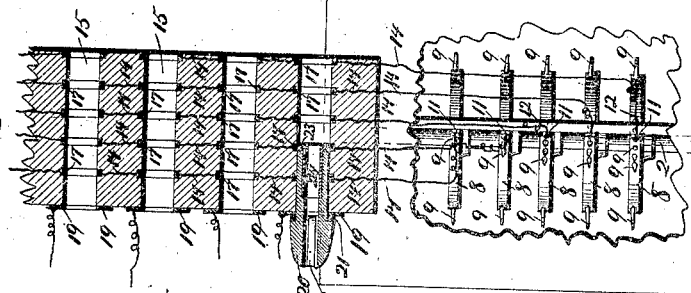
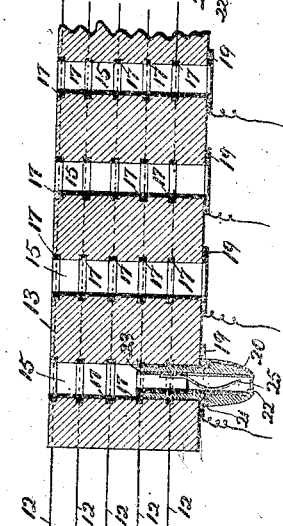
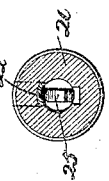
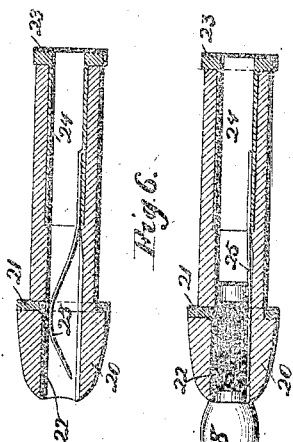
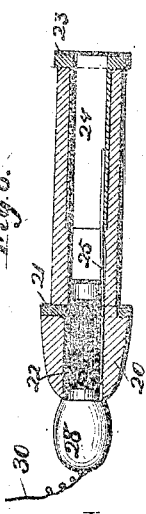
Witnesses
J. Jessen
B. Booth
Inventor
Henry L. Carpenter.
By Paul & Merwin Attys

UNITED STATES PATENT OFFICE.

HENRY L. CARPENTER, OF MINNEAPOLIS, MINNESOTA.

AUTOMATIC TELEPHONE-CALL.

SPECIFICATION forming part of Letters Patent No. 422,722, dated March 4, 1890.

Application filed June 27, 1889. Serial No. 315,329. (No model.)

*To all whom it may concern:*

Be it known that I, HENRY L. CARPENTER, of Minneapolis, in the county of Hennepin and State of Minnesota, have invented certain new and useful Improvements in Automatic Telephone-Calls, of which the following is a specification.

This invention relates to improvements in calls for telephone systems; and the object of the invention is to provide an improved mechanism which may be used in connection with a telephone-exchange to operate the call-bell upon any desired line automatically and regularly.

Other objects of the invention will appear from the following detailed description, taken in connection with the accompanying drawings, in which—

Figure 1 represents a partial section and elevation of my improved call system. Fig. 2 is a horizontal section on line $x$ $x$ of Fig. 1. Fig. 3 is a vertical section on line $y$ $y$ of Fig. 1. Figs. 4, 5, and 6 are details.

In the drawings, 2 represents a shaft mounted in suitable bearings and arranged to be driven constantly by means of a suitable train of gears 3, 4, and 5, which may be operated by a weight 6; or the shaft may be driven by any other preferred motive power. This shaft is provided with a series of wheels or disks 8, each of which is provided with a series of circuit-closers 9. The circuit-closers upon each wheel are arranged in groups, as shown, those upon the first wheel being arranged in groups of two, those upon the second wheel in groups of three, and so on. The shaft 2 is connected to a wire 10, forming part of an electric circuit. Arranged opposite each of the wheels 8 is a suitable spring 11, against which the projections 9 upon the disks 8 come in contact as said wheels are rotated. Each of the springs 11 is connected to a wire 12, which extends to a suitable switch-board. The switch-board 13 is provided with a series of holes or openings 15, arranged, preferably, in vertical rows therein. The wires 12 extend, preferably, the full length of said switch-board, and vertical wires 14 are connected to each of the wires 12 and extend vertically across said board. The holes 15 in the board 13 are each provided upon their inner surface with a contact-strip 17. Each opening is provided with a series of these contact-strips arranged at regular intervals upon the inner surface of said opening. The wires 14 extend to and connect with said contact-strips 17 in regular order. For example, let it be supposed that the wire 12 is connected to the contact-spring 11, which is opposite the wheel 8, having the projections thereon arranged in groups of two. The wires 14, which are connected to this wire 12, may then all extend to and be connected with the first contact-strip in all of said openings. A metallic plate 19 surrounds the opening 15 and is connected to the circuit-wire.

20 represents a hollow plug, which is adapted to be inserted into any one of the openings 15. This plug is provided with a metallic shoulder 21, which is adapted to come in contact with the plate 19, and is also connected with a metallic strip 22 in the forward end of said plug. The plug is provided at its rear end with a metal ring 23, which is connected with a lining 24 upon the interior of the plug. This lining 24 is insulated from the shoulder 21 and contact-strip 22. A spring 25 is secured within the plug 20 in connection with the metal lining 24, and this spring is arranged to bear upon the contact-strip 22, and when it bears upon this strip it makes an electrical connection between the ring 23 and the shoulder 21. The plugs 20 are made of different lengths, there being as many different lengths of plugs as there are wheels 8 upon the shaft 2 and corresponding contact-strips 17 upon the inner surfaces of the openings 15. When a plug 20 is inserted in an opening 15, the ring 23 at its end comes in contact with one of the contact-pieces 17, and the corresponding wire 12 is thus brought into electrical connection with the plate 19, and the rotation of the wheel 8, bringing its projections 9 against the contact-spring 11, causes a series of electrical impulses to be sent through this circuit, and giving the call corresponding to the number of projections in each group upon said wheel 8. By this means the telephone-call bells upon the circuit will be operated. When the person whose call is represented by the number thus rung has responded to the call in the usual way, the operator at the central station will insert into the plug 20 a plug 28, having a circuit-wire 30 connected thereto. This plug moves a spring away from the contact-strip 22, and cuts out the call-operating mechanism and makes connection between the wire 30 and the plate 19, and the telephones will now be in circuit for communication in the usual way.

I claim as my invention—

1. In a telephone-call, the combination, with a switch-board having a series of openings and a series of circuit-wires, of a hollow plug adapted to connect any one of said wires with the main circuit-wire and containing separable circuit-terminals, a plug adapted to be inserted in said hollow plug and disconnect said terminals, and a constantly-running mechanism provided with circuit-closers arranged to close the circuits through the wires of the switch-board.

2. In a telephone-call, the combination, with the telephone-circuits, of a series of partial circuits provided with circuit-closers arranged in groups and mechanism for automatically operating said circuit-closers, hollow contact-plugs adapted to connect any one of said partial circuits with the telephone-circuits and containing separable circuit-terminals, and a plug adapted to be inserted in said hollow plug and disconnect said circuit-terminals, substantially as described.

3. In a telephone-call, the combination, with a switch-board provided with a series of openings having circuit-terminals arranged at intervals upon the walls of said openings, of wires connected to said terminals, and also connected to other circuit-terminals, and a constantly-running mechanism provided with circuit-closers arranged in groups and adapted to close the circuits through said last-named terminals, substantially as described.

4. The combination, with the switch-board having the series of openings and the series of circuit-wires, of a hollow plug adapted to connect any one of said wires with the main circuit-wire and containing separable circuit-terminals and a plug adapted to be inserted in said hollow plug and disconnect said circuit-terminals.

In testimony whereof I have hereunto set my hand this 5th day of June, 1889.

HENRY L. CARPENTER.

In presence of—
A. C. PAUL,
A. M. GASKILL.